US011313510B2

(12) United States Patent
Collins et al.

(10) Patent No.: US 11,313,510 B2
(45) Date of Patent: Apr. 26, 2022

(54) COLUMN AND LEG LOCKING ASSEMBLIES FOR STATIONARY PLATFORMS

(71) Applicant: Sheltered Wings, Inc., Barneveld, WI (US)

(72) Inventors: Alec Collins, Barneveld, WI (US); David M. Hamilton, Barneveld, WI (US)

(73) Assignee: SHELTERED WINGS, INC., Barneveld, WI (US)

( * ) Notice: Subject to any disclaimer, the term of this patent is extended or adjusted under 35 U.S.C. 154(b) by 0 days.

(21) Appl. No.: 16/818,301

(22) Filed: Mar. 13, 2020

(65) Prior Publication Data

US 2020/0292125 A1 Sep. 17, 2020

Related U.S. Application Data

(60) Provisional application No. 62/817,876, filed on Mar. 13, 2019.

(51) Int. Cl.
*F16M 11/28* (2006.01)
*F16B 7/14* (2006.01)
*F16M 11/32* (2006.01)

(52) U.S. Cl.
CPC .............. *F16M 11/28* (2013.01); *F16B 7/149* (2013.01); *F16M 11/32* (2013.01)

(58) Field of Classification Search
CPC ........... F16M 11/32; F16M 11/28; F16B 7/14; F16B 7/1418; F16B 7/1427; F16B 7/1463; F16B 7/149; F16B 2007/16; F16B 7/1409; F16B 7/1436; F16B 7/1454; F16B 7/1481; F16B 7/10
See application file for complete search history.

(56) References Cited

U.S. PATENT DOCUMENTS

| | | | | |
|---|---|---|---|---|
| 4,277,197 A | * | 7/1981 | Bingham | B25G 1/04 403/104 |
| 4,779,305 A | | 10/1988 | Gorsek | |
| 8,006,429 B2 | | 8/2011 | Windauer | |
| 10,145,402 B2 | * | 12/2018 | Nakatani | F16B 2/14 |
| 2001/0008854 A1 | | 7/2001 | Costain et al. | |
| 2007/0137089 A1 | | 6/2007 | William, III et al. | |
| 2008/0253600 A1 | * | 10/2008 | Wetzel | F16M 11/28 381/362 |
| 2009/0146023 A1 | | 6/2009 | Finkelstein | |
| 2016/0238082 A1 | * | 8/2016 | Densborn | F16D 3/06 |
| 2017/0016466 A1 | * | 1/2017 | Kim | F16B 7/149 |

OTHER PUBLICATIONS

International Search Report and Written Opinion for International Application No. PCT/US20/22652 dated Oct. 23, 2020, 16 pages.

* cited by examiner

*Primary Examiner* — Christopher Garft
(74) *Attorney, Agent, or Firm* — Husch Blackwell LLP (57) ABSTRACT

The disclosure relates to locking assemblies. In one embodiment, the disclosure relates to locking assemblies for a center column of a stationary platform. In another embodiment, the disclosure relates to locking assemblies for legs of a stationary platform.

18 Claims, 6 Drawing Sheets

COLUMN AND LEG LOCKING ASSEMBLIES FOR STATIONARY PLATFORMS

CROSS-REFERENCE TO RELATED APPLICATIONS

This application is a non-provisional application of and claims priority to U.S. Provisional Application No. 62/817,876 filed Mar. 13, 2019, which is incorporated herein by reference in its entirety.

FIELD

The disclosure relates to locking assemblies. In one embodiment, the disclosure relates to locking assemblies for a center column of a stationary platform. In another embodiment, the disclosure relates to locking assemblies for legs of a stationary platform.

BACKGROUND

When using a long rifle, AR platform rifle, shotgun or similar long firearm, it is common to use a bipod, tripod or other stationary platform to support the end of the firearm when shooting, particularly when targeting shooting. Stationary platforms support a firearm to provide a stable base to improve accuracy compared to simply holding the firearm without support. To provide a stable base, stationary platforms include two or more legs which extend diagonally downward from a central firearm mount, which may be on a central column. The central column and/or legs often come in two or more pieces to allow for adjusting the length of the column and/or legs and also allows for a user to decrease the weight of a stationary platform by leaving pieces behind when they are not needed.

When multiple parts are of a central column or legs are connected, it is important that the connection be tight and stable. However, current connections do not provide the necessary stability. Multi-piece central columns are generally joined by threading the pieces together. When in use, a user will rotate the top of the center column axially (e.g., to aim) and the threads are unintentionally loosened. Similarly, current twist-lock designs for telescoping legs do not restrict the amount that the lock unthreads. As a result, legs can collapse if the twist lock is not turned (or not turned far enough) in the right direction.

Therefore, it would be desirable to provide a locking mechanism for use with a multi-piece center column of a stationary platform and a locking mechanism for use with telescoping legs of a stationary platform to prevent accidental loosening or detachment of these components.

SUMMARY

In one embodiment, the disclosure provides a locking assembly. In an embodiment, the locking assembly secures two column portions together.

In one embodiment, the locking assembly comprises a first column portion having a hollow interior with a generally circular cross-section along a length of the first column portion; an insert secured within an end portion of the first column portion, the insert having a first end which is solid contained within the first column portion, a threaded channel passing through the solid end, an inner cavity, and a second end which opens to the inner cavity; wherein the inner cavity has a non-circular cross-section; a second column portion having a main body and a first end, the first end having a non-circular cross-section corresponding to that of the inner cavity of the insert, wherein the first end is slidingly but not rotatably engaged with the inner cavity of the insert, the second column portion further having a channel through the first end, the channel being coaxial with the threaded channel of the insert; and a fastening rod having a threaded end, wherein the fastening rod passes through the channel of the second column portion and engages the threaded channel of the insert.

In another embodiment, fastening rod further includes a fastening ring adjacent the threaded end, wherein the fastening ring has external dimensions greater than those of the channel of the second column portion. In another embodiment, the non-circular cross-section of the inner cavity of the insert is selected from square, rectangular, triangular, and polygonal. In another embodiment, the non-circular cross-section of the first end of the second column is selected from square, rectangular, triangular, and polygonal. In another embodiment, the non-circular cross-section of the inner cavity of the insert is square. In another embodiment, the non-circular cross-section of the first end of the second column portion is square. In another embodiment, the first column portion has an outer diameter which is the same as an outer diameter of the main body of the second column portion.

In another embodiment, the disclosure provides a stationary platform comprising the locking assembly. In another embodiment, the stationary platform comprises a central column, the central column comprising the locking assembly. In an embodiment, the stationary platform is a tripod.

In one embodiment, the disclosure provides a further locking assembly. In an embodiment, the further locking assembly secures two telescoping cylindrical portions together.

In one embodiment, the locking assembly comprises a locking ring secured to a first cylindrical section, the first cylindrical section insertable into a second cylindrical section and having a bearing surface at a second edge; a first rotation stop secured to the second cylindrical section at a first end and slidable against the locking ring at a second end; and a locking nut having a first end in threaded engagement with the first end of the rotation stop and having a second end secured to a locking wedge having a bearing surface, wherein rotational movement of the locking nut in a first direction causes the bearing surface of the locking wedge to engage the bearing surface of the locking ring and rotational movement of the locking nut in a second direction causes the bearing surface of the locking wedge to disengage the bearing surface of the locking ring.

In another embodiment, the locking ring has a first edge containing a second bearing surface and the first rotation stop has a bearing surface corresponding to the second bearing surface of the locking ring. In another embodiment, rotational movement of the locking nut in the first direction causes the second bearing surface of the locking ring to engage the bearing surface of the first rotation stop and rotational movement of the locking nut in the second direction causes the second bearing surface of the locking ring to disengage the bearing surface of the first rotation stop. In another embodiment, the locking ring, first rotation stop, locking nut and locking wedge are generally cylindrical and coaxial with each other and the first and second cylindrical sections. In another embodiment, the first rotation stop has a second bearing surface and the locking nut has a first bearing surface, the second bearing surface of the first rotation stop and the first bearing surfaces of the locking nut being opposed to one another, and wherein rotational movement of the locking nut in the first direction is limited by engagement of the second bearing surface of the first rotation stop and the first bearing surface of the locking nut.

In another embodiment, the locking assembly further includes a second rotation stop secured to the first rotation stop, wherein the locking nut is slidable against the second rotation stop. In another embodiment, the second rotation stop has a first bearing surface and the locking nut has a second bearing surface, the first bearing surface of the second rotation stop and the second bearing surface of the locking nut being opposed to one another, and wherein rotational movement of the locking nut in the second direction is limited by engagement of the first bearing surface of the second rotation stop and the second bearing surface of the locking nut.

In another embodiment, the first end of the first rotation stop and the first end of the locking nut are correspondingly threaded, and wherein the thread pitch is from 0.5 mm to 1.5 mm. In one embodiment, the threaded pitch is at least 0.5 mm. In another embodiment, the threaded pitch is no greater than 1.5 mm. In one embodiment, the threaded pitch is from is from 0.5 mm to 1.25 mm or from 0.5 mm to 1.0 mm or from 0.5 mm to 0.75 mm. In yet another embodiment, the threaded pitch is from 0.6 mm to 1.5 mm or from 0.7 mm to 1.5 mm or from 0.8 to 1.5 mm or from 0.9 mm to 1.5 mm or from 1.0 mm to 1.5 mm or from 1.25 mm to 1.5 mm.

In another embodiment, the locking assembly further includes a grip secured to the locking nut and locking wedge.

In another embodiment, the disclosure provides a stationary platform comprising the further locking assembly. In another embodiment, the stationary platform comprises at least one telescoping leg, the at least one telescoping leg comprising the locking assembly. In an embodiment, the stationary platform is a tripod.

In another embodiment, the disclosure provides a stationary platform comprising one or both locking assemblies as described herein, or any combination of one or both locking assemblies as described herein.

Other embodiments will be evident from a consideration of the drawings taken together with the detailed description provided herein.

DETAILED DESCRIPTION

The assemblies, apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a stationary platform, such as a bipod, tripod, and other permutations of stationary platforms. Further, it will be appreciated by those skilled in the art that the various features and/or capabilities described herein may be deployed in various industries, including shooting, photography, surveying, and other areas in which a stable stationary platform is desired to secure a viewing optic, firearm, sight, camera, and other such device.

Definitions

Like numbers refer to like elements throughout. It will be understood that, although the terms first, second, etc., may be used herein to describe various elements, components, regions, and/or sections, these elements, components, regions and/or sections should not be limited by these terms. These terms are used only to distinguish one element, component, region and/or section from another element, component, region and/or section. Thus, a first element, component, region or section could be termed a second element, component, region or section without departing from the disclosure.

The numerical ranges in this disclosure are approximate, and thus may include values outside of the range unless otherwise indicated. Numerical ranges include all values from and including the lower and the upper values (unless specifically stated otherwise), in increments of one unit, provided that there is a separation of at least two units between any lower value and any higher value. As an example, if a compositional, physical or other property, such as, for example, distance, speed, velocity, etc., is from 10 to 100, it is intended that all individual values, such as 10, 11, 12, etc., and sub ranges, such as 10 to 44, 55 to 70, 97 to 100, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

Spatial terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the term "and/or" includes any and all combinations of one or more of the associated listed items. For example, when used in a phrase such as "A and/or B," the phrase "and/or" is intended to include both A and B; A or B; A (alone); and B (alone). Likewise, the term "and/or" as used in a phrase such as "A, B and/or C" is intended to encompass each of the following embodiments" A, B and C; A, B, or C; A or C; A or B; B or C; A and C; A and B; B and C; A (alone); B (alone); and C (alone).

It will be understood that when an element or layer is referred to as being "on," "connected to" or "coupled to" another element or layer, it can be directly on, connected or coupled to the other element or layer. Alternatively, intervening elements or layers may be present. In contrast, when an element or layer is referred to as being "directly on," "directly connected to" or "directly coupled to" another element or layer, there are no intervening elements or layers present.

As used herein, "bearing surface" is the area of contact between two objects.

As used herein, the terms "user" and "shooter" interchangeably refer to either the operator making the shot or an individual observing the shot in collaboration with the operator making the shot.

As used herein, the term "viewing optic" refers to an apparatus or assembly used by a user, a shooter or a spotter to select, identify and/or monitor a target. A viewing optic may rely on visual observation of the target or, for example, on infrared (IR), ultraviolet (UV), radar, thermal, microwave, magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to a user/shooter/spotter by a viewing optic may be unaltered, or it may be enhanced, for example, by magnification, amplification, subtraction, superimposition, filtration, stabilization, template matching, or other means. The target selected, identified and/or monitored by a viewing optic may be within the line of sight of the shooter or tangential to the sight of the shooter. In other embodiments, the shooter's line of sight may be obstructed while the viewing optic presents a focused image of the target. The image of the target acquired by the viewing optic may, for example, be analog or digital, and shared, stored archived or transmitted within a network of one or more shooters and spotters by, for example, video, physical cable or wire, IR, radio wave, cellular connections, laser pulse, optical 802.11b or other wireless transmission using, for example, protocols such as html. SML, SOAP, X.25, SNA, etc., Bluetooth, Serial, USB or other suitable image distribution method. The term "viewing optic" is used interchangeably with "optic sight."

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle and an assault rifle.

As used herein, a "stationary platform" is a structure or device used to support a viewing optic and/or firearm.

Figure 1:
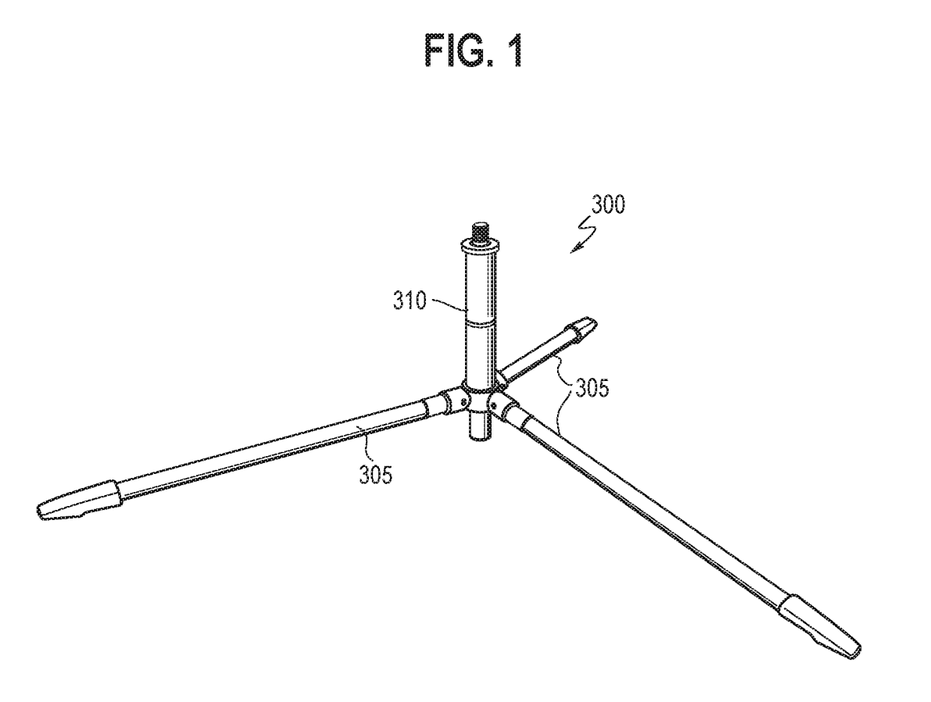
FIG. 1 shows an exemplary stationary platform that is a tripod, in accordance with embodiments of the disclosure.

FIG. 1 illustrates an exemplary stationary platform 300 that in the embodiment shown is a tripod with a center column 305 connected to three legs 310. The center column 305 has two sections which connect to extend the length of the center column 305. Similarly, the legs 310 telescope to change the length of the legs 310.

Figure 2:
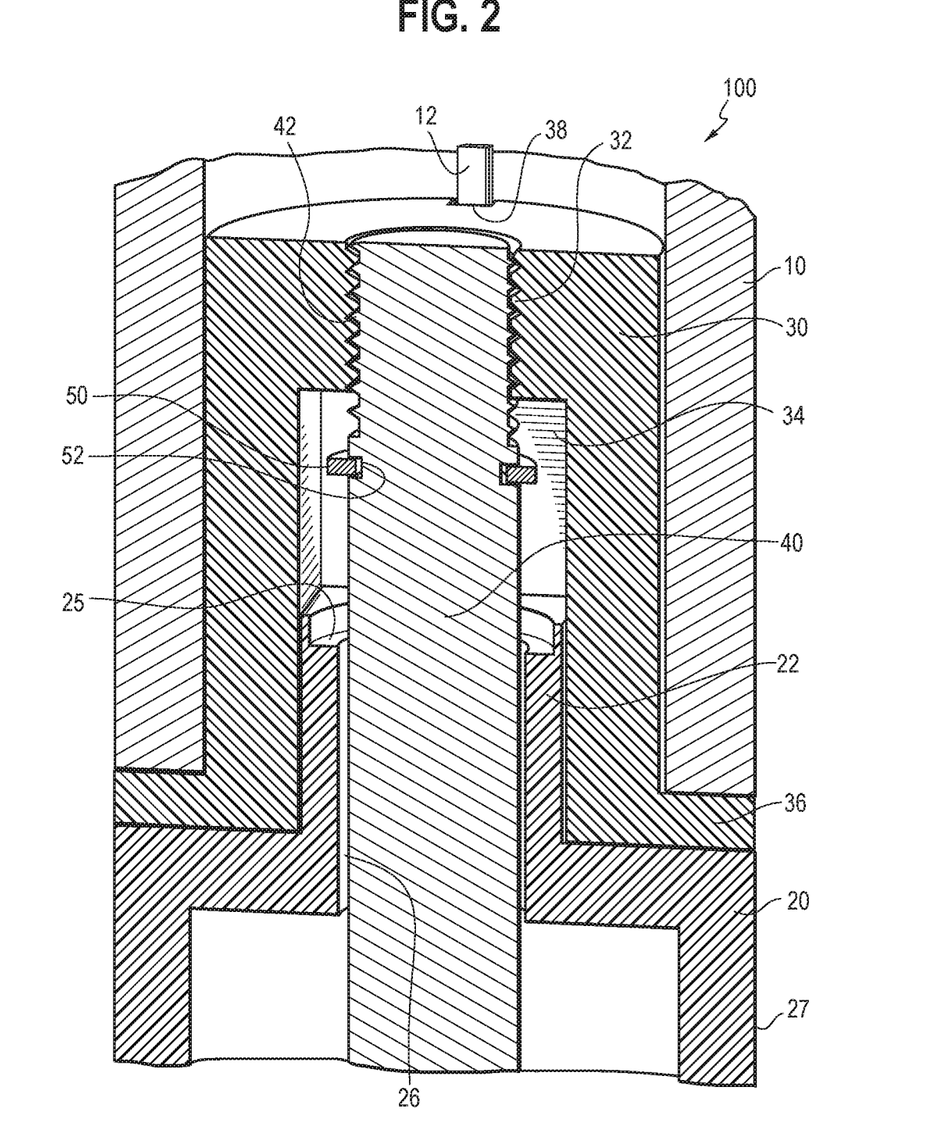
FIG. 2 is a cross-sectional view of a locking assembly for a center column of a stationary platform, in accordance with embodiments of the disclosure.

FIG. 2 is a cross-sectional view of a locking assembly 100 showing the connection of a first column section 10 and a second column section 20. In the embodiment shown, the first column section 10 is an upper column section and the second column section 20 is a lower column section. In one representative embodiment shown, the inner diameter of the first column section 10 is generally circular. The inner diameter of the first column may have other suitable shapes and geometries.

An insert 30 is secured in the first column section 10. The insert 30 decreases the inner diameter of the first column section 10. In the embodiment shown, the insert 30 is generally cylindrical with a circular cross-section. The outer diameter of the insert 30 is just less than the inner diameter of the first column section 10 to allow the insert 30 to be slid into the first column section 10. A terminating flange 36 extending radially from the lower portion of the insert 30 prevents the insert 30 from being inserted too far into the first column section 10. A threaded bore 32 extends through the upper surface of the insert 30.

In an embodiment, the insert 30 is permanently secured to the inside of the first column section 10. This permanent connection can be achieved in any number of ways, including, for example, by an adhesive means such as glue, epoxy, and the like, by a mechanical connection such as mating and/or interlocking structures, or combinations of these and other means. In further embodiments, the insert 30 is removably secured to the inside of the first column section 10.

In the embodiment shown, the inner surface of the first column section 10 contains a guiding protuberance 12 and the outer surface of the insert 30 contains a corresponding channel 38. When sliding the insert 30 into the first column section 10, the guiding protuberance 12 and channel 38 must be aligned. This facilitates assembly of the first column section 10 and insert 30. Further, the engagement of the protuberance 12 and channel 38 prevents rotation of the insert 30 inside the first column section 10.

While the outer surface of the insert 30 is generally cylindrical with a circular cross-section, the inner cavity 34 of the insert 30 is non-circular. That is, the inner cavity 34 of the insert 30 does not have a circular cross-section. In the embodiment shown, the inner cavity 34 is square (has a square cross-section). However, in further embodiments, the inner cavity 34 may have any non-circular geometry including, but not limited to, square, rectangle, oval, triangle, star, trapezoid, or any polygon.

The geometry of the inner cavity 34 of the insert 30 matches the outer geometry of the male end 22 of the second column section 20. The male end 22 of the second column section 20 extends outwardly (and upwardly, in the orientation shown) from the main body 27 of the second column portion 20. The second column portion is generally cylindrical with a circular cross-section and having and outer diameter approximately equal to that of the first column section 10.

The outer geometry of the male end 22 is any non-circular geometry corresponding to that of the inner cavity 34 of the inset 30. In the specific embodiment shown, that geometry is square; however, as detailed above, any non-circular geometry is acceptable, including, but not limited to, square, rectangle, oval, triangle, star, trapezoid, or any polygon. A channel 26 passes through the male end 22 and opens into the inner cavity 34 of the insert 30. Channel 26 and channel 32 are coaxially aligned; however, unlike channel 32, the interior of channel 26 is not threaded.

The male end 22 also includes a shelf 25 which, in the embodiment shown, is a circular recess in the male end 22.

Fastening rod 40 is received in channels 26 and 32. The fastening rod 40 is the connector that holds the first column portion 10 and second column portion 20 together. The fastening rod is generally cylindrical with a circular cross-section. The tip 42 of the fastening rod 40 is threaded with the thread pattern corresponding to that of the threaded channel 32. It will be appreciated that the inner diameter of the channel 26 is just bigger than the outer diameter of the fastening rod 40 to permit the fastening rod 40 to be easily inserted into the channel 26 and, as discussed below, to spin freely within the channel 26.

The fastening rod 40 further includes a fastening ring 50 which is secured to the fastening rod 40 by engagement with a groove 52. The fastening ring 50 increases the diameter of the fastening rod 40 and engages the shelf 25 to prevent the fastening rod 40 from disengaging the male end 22 of the second column portion 20.

Turning to FIG. 2, the fastening rod 40 terminates at its lower end in a grasping portion 45.

In use, the first column portion 10 will always be used by a user when the stationary platform 300 is used. The viewing optic is secured to connection member 17, which, in the embodiment shown, is a threaded connector; however, in other embodiments, a viewing optic can secure to the first column portion 10 in any manner. When a user wants to increase the length of the center column by using a second column portion 20, the second column portion 20 (and more specifically, the male end 22 and threaded end 42 of the fastening rod 40, are slid into the insert 30 and first column portion. The male end 22 must be oriented such that the non-circular geometry of its outer surface aligns with the non-circular geometry of the cavity 34. Once properly aligned, the fastening rod 40 is twisted using the grasping portion 45. Being freely rotatable in the channel 26, the rotation of the fastening rod 40 does not cause rotation of the second column portion 20. Once connected, any attempted rotation of the first column portion 10 or second column portion 20 will not disengage the two column portions due to the non-circular geometry of the male portion 22 and cavity 34. That is, the two column portions 10, 20 cannot rotate independently of one another because the square shape of the male portion 22 cannot spin within the square shape of the cavity 34.

To disengage the first and second column portions 10, 20, the user must rotate the fastening rod 40 using the grasping portion 45. Once the threaded end 42 of the fastening rod 40 is disengaged from the threaded channel 32, the fastening rod 40 and second column portion 20 together can be disengaged from the insert 30 and first column portion 10.

It will be appreciated that existing stationary platforms can be retrofit with the locking assembly 100. The insert 30 can be sized to fit an existing first column portion 10 and a corresponding second column portion 20 compatible with the insert 30 provided.

Figure 3:
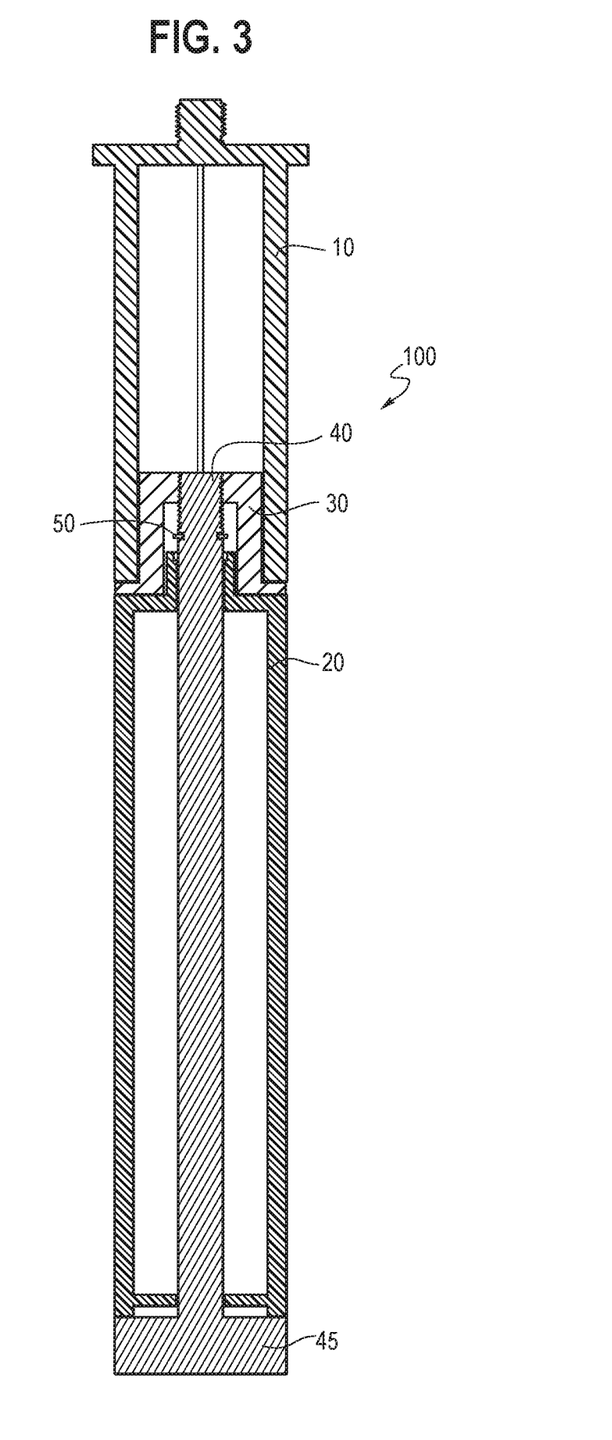
FIG. 3 is a further cross-sectional view of the locking assembly of FIG. 2 in accordance with embodiments of the disclosure.

FIG. 3 is a cross-sectional view of a locking assembly 200 showing the connection of a small leg section 110 which telescopes into and is secured with a large leg section 120. In the embodiment shown, the small leg section 110 is generally cylindrical with a circular cross-section which is generally uniform along the length of the small leg section 110. Similarly, the large leg section 120 is generally cylindrical with a circular cross-section which is generally uniform along the length of the large leg section 120. The outer diameter of the small leg section 110 is less than the inner diameter of the large leg section 120 so that the small leg section 110 is slidable (telescoping) within the large leg section 120.

The small leg section 110 has a section stop 160 and a locking ring 170 secured to its outer diameter.

Figure 4:
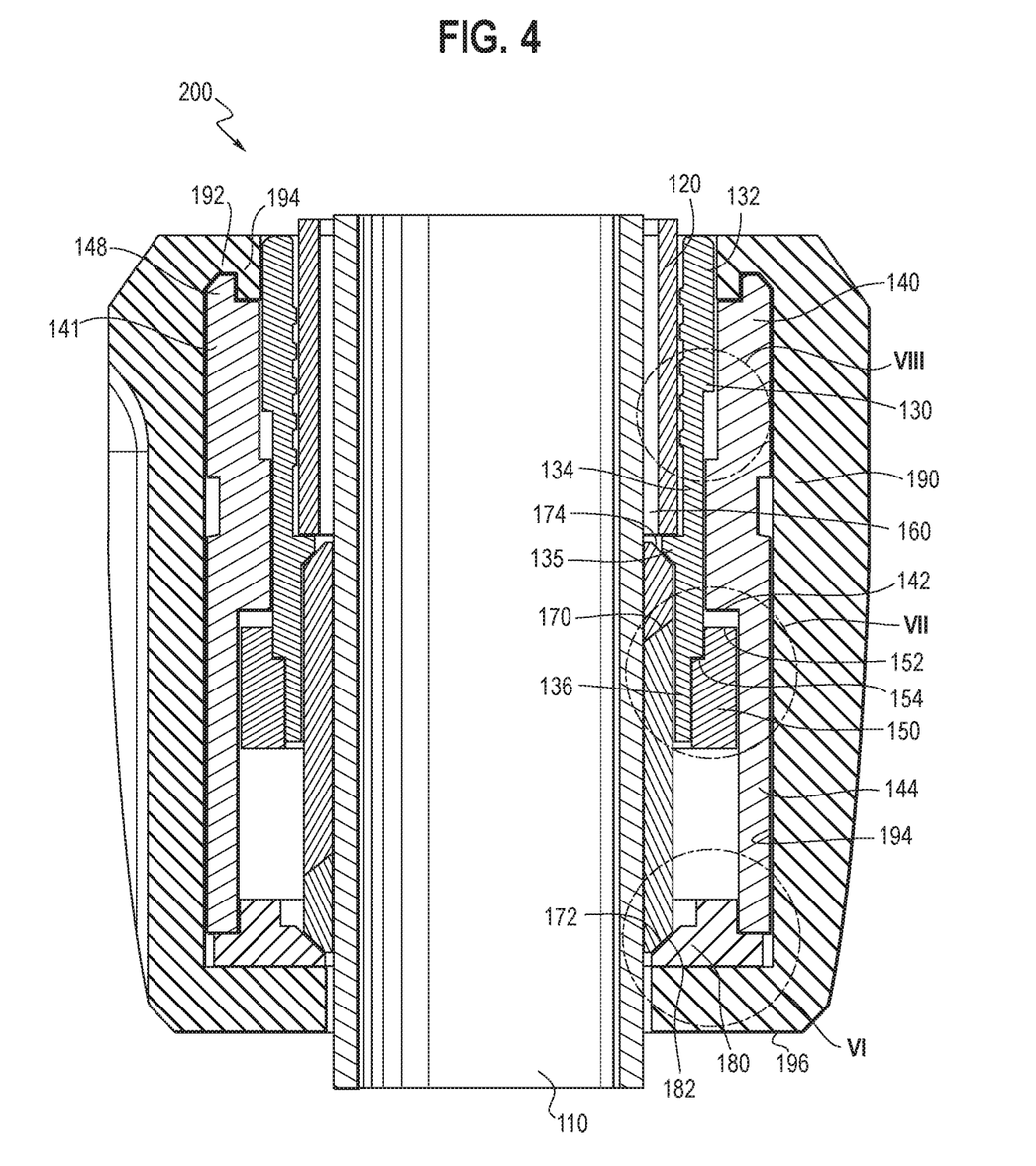
FIG. 4 is a cross-sectional view of a locking assembly for an adjustable leg of a stationary platform in accordance with embodiments of the disclosure.
Figure 5:
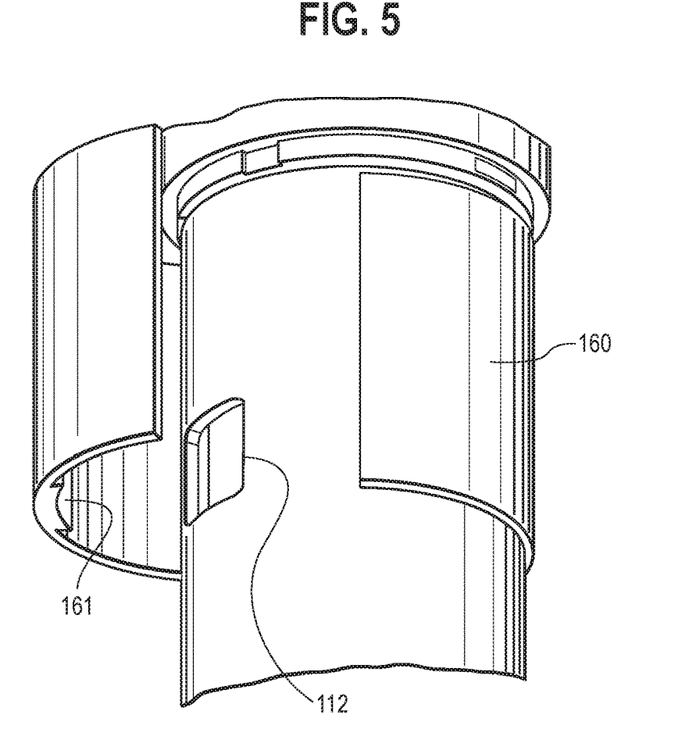
FIG. 5 is a side view of a portion of an inner leg section with a section stop in accordance with embodiments of the disclosure.

The section stop 160 can be secured to the outer surface of the small leg section 110 in any way. For example, as shown in FIG. 5, the outer surface of the small leg section 110 includes a female locating portion 112 which engages a male locating portion 161 on the inner surface of the section stop 160. Alternate and/or additional securing means may be used to secure the section stop 160 to the outer surface of the small leg portion 110, including, but not limited to, adhesive means such as glue, epoxy, and the like, by a mechanical connection such as mating and/or interlocking structures, or combinations of these and other means. As shown in FIGS. 4 and 5, the section stop 160 is a continuous cylinder around the outer diameter of the small leg section 110. However, in further embodiments, the section stop 160 may be discontinuous around the outer surface of the small leg section 110 provided there is sufficient coverage to engage the necessary portions of the locking assembly 200 as described in further detail below.

The locking ring 170 is also shown as a continuous cylinder around the outer diameter of the small leg section 110, though can also be discontinuous in other embodiments provided there is sufficient structure to engage the necessary portions of the locking assembly 200 as described in further detail below. The locking ring 170 as shown also has a generally trapezoidal cross-section, with diagonal bearing surfaces 172, 174.

Similarly, a rotation stop 130 is secured to the outer diameter (outer surface) of the large leg section 120. Like the section stop 160, the rotation stop 130 may be secured to the outer surface of the large leg section 120 using any means suitable, including, but not limited to, adhesive means such as glue, epoxy, and the like, by a mechanical connection such as mating and/or interlocking structures (e.g., threads), or combinations of these and other means. Further, in the embodiment shown, the rotation stop 130 is generally cylindrical and continuous around the outside diameter of the large leg section 120. However, in further embodiments, the rotation stop 130 may be discontinuous around the outer surface of the large leg section 120 provided there is sufficient coverage to engage the necessary portions of the locking assembly 200 as described in further detail below.

The first rotation stop 130 has a first (upper) portion 132 which is generally thicker than the rest of the first rotation stop 130. In other words, the outer diameter of the first portion 132 is greater than the outer diameter of the remaining portions of the first rotation stop 130. The first portion 132 transitions suddenly to a middle portion 134 having an outer diameter less than that of the first portion 132. Bearing surface 139 results from the sudden transition of the first portion 132 to the middle portion 134. Part way along the inner surface of the middle portion 134 is protuberance 135. Protuberance 135 has two bearing surfaces—an upper and a lower. The upper bearing surface engages the bottom surface of the large leg section 120 to limit how far up on the large leg section 120 the first rotation stop 130 can be secured. The middle portion 134 again transitions suddenly to the third portion 136, thereby forming bearing surface 138.

A locking nut 140 is positioned on the outer surface of the first rotation stop 130. In the embodiment shown, portions of the outer surface of the first rotation stop 130 are threaded and corresponding portions of the inner surface of the locking nut 140 are correspondingly threaded. Engagement of the threads secures the locking nut 140 to the first rotation stop 130 while permitting rotating movement of the locking nut 140 relative to the first rotation stop 130. However, in further embodiments, the first rotation stop 130 and locking nut 140 may be secured to one another in any manner which permits rotational movement of the two components relative to one another.

As with the section stop 160 and first rotation stop 130, the locking nut 140 is generally cylindrical and continuous around the outside diameter of the first rotation stop 130. However, in further embodiments, the locking nut 140 may be discontinuous around the outer surface of the first rotation stop 130 provided there is sufficient coverage to engage the necessary portions of the locking assembly 200 as described in further detail below.

The locking nut 140 has a first portion 141 which transitions abruptly to second portion 144. The first portion 141 has a thickness greater than that of second portion 144, with the inner diameter of the second portion 144 being greater than that of the first portion 141 and resulting in bearing surface 142.

In the embodiment shown in FIG. 4, the inner surface of the first portion 141 is in threaded engagement with the outer surface of the first rotation stop 130, and particularly with the first and second portions 132, 134 of the first rotation stop 130. A second rotation stop 150 is in threaded engagement with the third portion 136 of the first rotation stop 130.

The second rotation stop 150 is generally cylindrical and continuous around the outside diameter of the third portion 136 of the first rotation stop 130. However, in further embodiments, the second rotation stop 150 may be discontinuous provided there is sufficient coverage to engage the necessary portions of the locking assembly 200 as described in further detail below.

Figure 7:
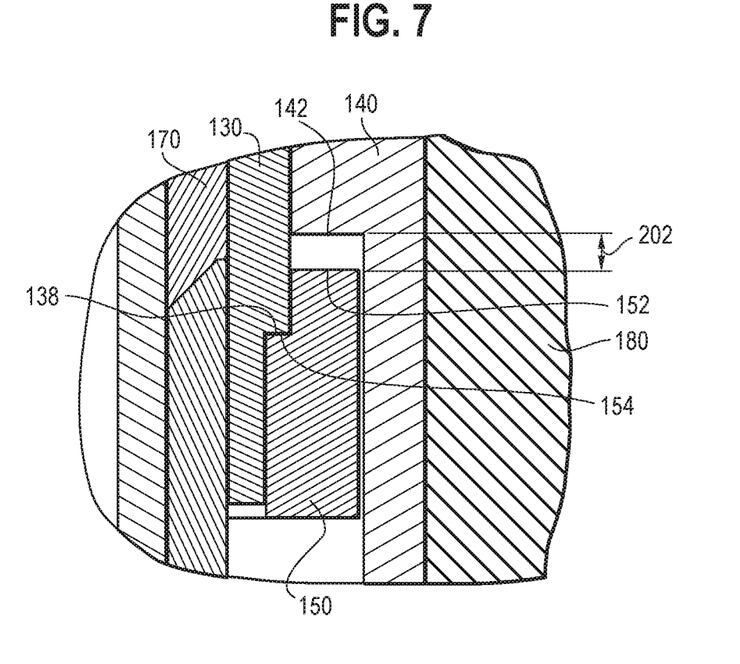
FIG. 7 is an enlarged view of portion VII of FIG. 4.

As shown in FIG. 7, the second rotation stop 150 is positioned between the second portion 144 of the locking nut 140 and the third portion 136 of the first rotation stop 130. The second rotation stop 150 therefore has a generally consistent outer diameter with an inner diameter greater at its first portion 157 than at its second portion 159. The transition between the first and second portions 157, 159 is abrupt, resulting in bearing surface 154 which engages bearing surface 138 to limit how far along the first rotation stop 130 the second rotation stop 150 can go. Upper surface 152 of the second rotation stop 150 is shown as neighboring, though not quite touching, bearing surface 142 of the locking nut 140.

Once the small leg section 110 is properly assembled with section stop 160 and locking ring 170, and the large leg section 120 is properly assembled with first rotation stop 130, locking nut 140, and second rotation stop 150, the small leg section assembly (110, 160, 170) is slid into the large leg section 120 until the bearing surface 174 of the locking ring 170 engages the protuberance 135 at its lower bearing surface. When in position, the section stop 160 is adjacent and slidable against the inner surface of the large leg section 120, and the inner surface of the third portion 136 of the first rotation stop 130 is adjacent and slidable against the outer surface of the locking ring 170.

Figure 6:
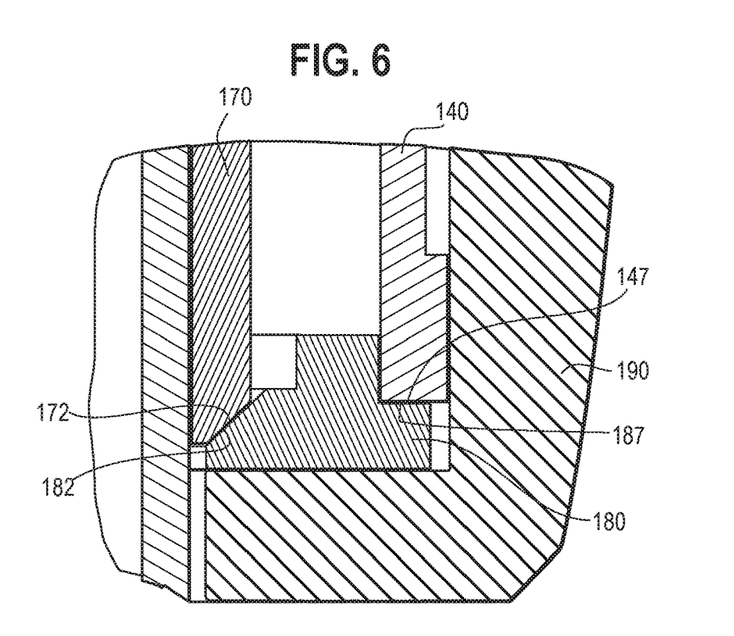
FIG. 6 is an enlarged view of portion VI of FIG. 4.

To prevent the small leg section assembly (110, 160, 170) from disengaging the large leg section assembly (120, 130, 140, 150), a locking wedge 180 is threaded into the inner diameter of the locking nut 140 at its second portion 144. As shown in FIG. 6, the locking wedge 180 has a bearing surface 182 which abuts the bearing surface 172 of the locking ring 170 and a bearing surface 187 which abuts the bottom surface 147 of the locking nut 140.

Grip 190 is secured over the entire locking assembly 200 to protect the assembly 200 as well as to permit a user to manipulate the assembly as described more fully below. As shown in FIG. 4, the grip 190 is generally cylindrical with an outer surface and an inner surface geometry designed to conform to the portions of the locking assembly 200 to which it secures. Specifically, the grip 190 has an upper portion 192 specifically designed to engage the contours of the upper section 148 of the locking nut 140. The smooth inner surface 194 of the grip 190 contacts the outer surface of the locking nut 140. The bottom portion 196 of the grip 190 contacts the underside of the locking wedge 180. The upper and bottom portions 192, 196 of the grip project inward toward the large leg section 120 and small leg section 110, respectively, to completely enclose the locking assembly 200.

The grip 190 may be permanently or removably secured to the outer surface of the locking nut 140 using any means suitable, including, but not limited to, adhesive means such as glue, epoxy, and the like, by a mechanical connection such as mating and/or interlocking structures (e.g., threads), or combinations of these and other means. Further, in the embodiment shown, the grip 190 is generally cylindrical and continuous around the outside diameter of the locking assembly 200. However, in further embodiments, the grip 190 may be discontinuous around the outside of the locking assembly 200 provided there is sufficient coverage to engage the necessary portions of the locking assembly 200 as described in further detail below.

In the embodiment shown in FIG. 4, the large leg section 120 is the leg section which is fixed to the top of a stationary platform, such as a tripod. The small leg section 110 extends outward from the inside of the large leg section 120 to increase the overall length of the leg (e.g., increase tripod height). The small leg section 110 and section stop 160 are fixedly secured to one another, meaning that, during operation of the locking assembly 200, the small leg section 110 and section stop 160 are not designed to move relative to one another, but rather move together as an assembly. Similarly, the large leg section 120, first rotation stop 130 and second rotation stop 150 are fixedly secured to one another so that the two components do not move relative to one another, but rather as an assembly. The grip 190, locking nut 140 and locking wedge 180 are also fixedly secured to one another, with the three parts moving together as an assembly. In one embodiment, the locking ring 170 is secured or held in place by other components of the assembly. In one embodiment, the locking ring 170 is encapsulated by the other components of the assembly. In one embodiment, the locking ring 170 is not permanently attached to any piece or component of the assembly.

The locking wedge 180 is slidable against the locking ring 170. The locking nut 140 is in threaded (movable) connection with the first rotation stop 130, meaning rotation of the grip 190/locking nut 140/locking wedge 180 assembly causes movement of the grip 190/locking nut 140/locking wedge 180 assembly up and down relative to first rotation stop 130. Because the second rotation stop 150 is fixedly secured to the first rotation stop 130, the locking nut 140 is slidable against the second rotation stop 150.

When securing or locking the small leg section 110 and large leg section 120 together (i.e., when the small leg section 110 is in the desired position relative to the large leg section 120), a user turns or rotates the grip 190 in the locking direction. In the embodiment shown, that direction is counterclockwise. Rotation of the grip 190 (e.g., in the counterclockwise direction in the embodiments shown) causes movement of the grip 190/locking nut 140/locking wedge 180 assembly upwards. This upward movement is caused by the engagement of the threads on the locking nut 140 with the threads of the first rotation stop 130. As the grip 190/locking nut 140/locking wedge 180 assembly moves upward, the bearing surface 182 of the locking wedge 180 pushes upward against the bearing surface 172 of the locking ring 170. This movement in essence compresses the locking ring 170 between the locking wedge 180 and first rotation stop 130. The angle of the bearing surfaces 172, 182 and bearing surface 174 and the lower bearing surface of protuberance 134 cause the locking ring 170 to push inward against the small leg section 110, as shown in further detail in FIG. 6. Upward movement of the locking nut 140 is prevented by contact between bearing surface 140 of the locking nut 140 and bearing surface 139 of the first rotation stop 130, as shown in FIG. 8.

Rotation of the grip 190 in the opposite direction (e.g., in the clockwise direction in the embodiments shown) loosens the locking assembly 200. Clockwise rotation of the grip 190 causes downward movement of the grip 190/locking nut 140/locking wedge 180 assembly by way of the threaded engagement of the locking nut 140 with the first rotation stop 130. Downward movement of the locking nut 140 is limited by contact between bearing surface 142 of the locking nut 140 and bearing surface 152 of the second rotation stop 150, as shown in FIG. 7. As the grip 190/locking nut 140/locking wedge 180 assembly moves downward, the locking wedge 180 ceases pushing on the locking ring 170, and the locking ring 170 therefore releases the small leg section 110 (i.e., the locking ring 170, and particularly bearing surfaces 172, 174, disengages bearing surface 182 and the lower bearing surface of protuberance 134, respectively). The small leg section 110 becomes again slidable within the lock assembly 200.

In the embodiment shown, the lock assembly 200 is specifically designed for the grip 190 to be rotated a total of ½ turn about the assembly 200. In particular, as shown in FIG. 7, the distance 202 between bearing surface 142 and bearing surface 152 has a maximum of 0.5 mm. This 0.5 mm gap is paired with a 1 mm thread pitch on the locking nut 140 and first rotation stop 130. With the 0.5 mm gap, a user can rotate the grip 190 a half turn which will cause the grip 190/locking nut 140/locking wedge 180 assembly to travel 0.5 mm downward and the bearing surfaces 142, 152 to meet. One of skill in the art can appreciate that the maximum distance 202 and the thread pitch on the locking nut 140 and first rotation stop 130 can be adjusted to achieve a desired amount of twist. That is, if a user desires a full turn to lock/unlock the small leg section 110, a maximum space height of 1.5 mm is desired if the thread pitch is kept at 1 mm.

Figure 8:
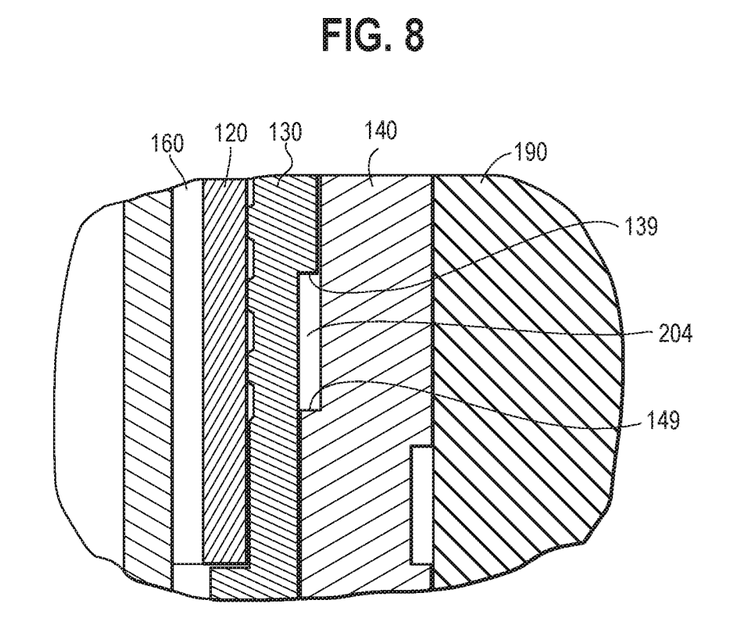
FIG. 8 is an enlarged view of portion VIII of FIG. 4.

The space 204 shown in FIG. 8 between bearing surface 130 and bearing surface 149 has a maximum height of greater than that distance 202. Providing a space with a height greater than distance 202 allows a user to tighten the lock assembly 200 beyond the ½ turn to unlock the lock assembly 200. It is sometimes desirable to tighten the lock assembly 200 to different degrees depending, for example, on the weight of the viewing optic mounted to the stationary platform. The heavier the viewing optic, the tighter the lock assembly 200 must be tightened.

The disclosure is now further described by the following paragraphs:

1. A locking assembly comprising:
a first column portion;
an insert having a first end contained within the first column portion, a threaded channel passing through at least a portion of the first end, an inner cavity, and a second end that opens to the inner cavity;
a second column portion having a main body and a first end, the first end having a shape corresponding to that of the inner cavity of the insert, wherein the first end is slidingly but not rotatably engaged with the inner cavity of the insert, the second column portion further having a channel through the first end, the channel being coaxial with the threaded channel of the insert; and
a fastening rod having a threaded end, wherein the fastening rod passes through the channel of the second column portion and engages the threaded channel of the insert.

2. The locking assembly of paragraph 1, wherein the first column portion has a hollow interior.

3. The locking assembly of any of the preceding paragraphs, wherein the first column portion has a generally circular cross-section along a length of the first column portion.

4. The locking assembly of any of the preceding paragraphs, wherein the insert is secured within an end portion of the first column portion.

5. The locking assembly of any of the preceding paragraphs, wherein the insert has a first end that is solid contained within the first column portion 6. The locking assembly of any of the preceding paragraphs, wherein the fastening rod further includes a fastening ring adjacent the threaded end, wherein the fastening ring has external dimensions greater than those of the channel of the second column portion.

7. The locking assembly of any of the preceding paragraphs, wherein the inner cavity of the insert has a non-circular cross-section.

8. The locking assembly of any of the preceding paragraphs, wherein the shape of the inner cavity of the insert is selected from square, rectangular, triangular, and polygonal.

9. The locking assembly of any of the preceding paragraphs, wherein the first end of the second column has a non-circular cross-section.

10. The locking assembly of any of the preceding paragraphs, wherein the shape of the first end of the second column is selected from square, rectangular, triangular, and polygonal.

11. The locking assembly of any of the preceding paragraphs, wherein the non-circular cross-section of the inner cavity of the insert is square.

12. The locking assembly of any of the preceding paragraphs, wherein the non-circular cross-section of the first end of the second column portion is square.

13. The locking assembly of any of the preceding paragraphs, wherein the first column portion has an outer diameter which is the same as an outer diameter of the main body of the second column portion.

14. A stationary platform comprising a central column, the central column comprising the locking assembly of any of the preceding paragraphs.

15. The stationary platform of claim 8, wherein the stationary platform is a tripod.

16. A locking assembly comprising:
a locking ring secured to a first cylindrical section, the first cylindrical section insertable into a second cylindrical section and having a bearing surface at a second edge;

a first rotation stop secured to the second cylindrical section at a first end and slidable against the locking ring at a second end; and a locking nut having a first end in threaded engagement with the first end of the rotation stop and having a second end secured to a locking wedge having a bearing surface, wherein rotational movement of the locking nut in a first direction causes the bearing surface of the locking wedge to engage the bearing surface of the locking ring and rotational movement of the locking nut in a second direction causes the bearing surface of the locking wedge to disengage the bearing surface of the locking ring.

17. The locking assembly of paragraph 16, wherein the locking ring has a first edge containing a second bearing surface and the first rotation stop has a bearing surface corresponding to the second bearing surface of the locking ring.

18. The locking assembly of any of the preceding paragraphs, wherein rotational movement of the locking nut in the first direction causes the second bearing surface of the locking ring to engage the bearing surface of the first rotation stop and rotational movement of the locking nut in the second direction causes the second bearing surface of the locking ring to disengage the bearing surface of the first rotation stop.

19. The locking assembly of any of the preceding paragraphs, wherein the locking ring, first rotation stop, locking nut and locking wedge are generally cylindrical and coaxial with each other and the first and second cylindrical sections.

20. The locking assembly of any of the preceding paragraphs, wherein the first rotation stop has a second bearing surface and the locking nut has a first bearing surface, the second bearing surface of the first rotation stop and the first bearing surfaces of the locking nut being opposed to one another, and wherein rotational movement of the locking nut in the first direction is limited by engagement of the second bearing surface of the first rotation stop and the first bearing surface of the locking nut.

21. The locking assembly of any of the preceding paragraphs, further including a second rotation stop secured to the first rotation stop, wherein the locking nut is slidable against the second rotation stop.

22. The locking assembly of any of the preceding paragraphs, wherein the second rotation stop has a first bearing surface and the locking nut has a second bearing surface, the first bearing surface of the second rotation stop and the second bearing surface of the locking nut being opposed to one another, and wherein rotational movement of the locking nut in the second direction is limited by engagement of the first bearing surface of the second rotation stop and the second bearing surface of the locking nut.

23. The locking assembly of any of the preceding paragraphs, wherein the first end of the first rotation stop and the first end of the locking nut are correspondingly threaded, and wherein the thread pitch is from 0.5 mm to 1.5 mm.

24. The locking assembly of any of the preceding paragraphs, wherein the first end of the first rotation stop and the first end of the locking nut are correspondingly threaded, and wherein the thread pitch is at least 0.5 mm.

25. The locking assembly of any of the preceding paragraphs, wherein the first end of the first rotation stop and the first end of the locking nut are correspondingly threaded, and wherein the thread pitch is no greater than 1.5 mm.

26. The locking assembly of any of the preceding paragraphs, wherein the first end of the first rotation stop and the first end of the locking nut are correspondingly threaded, and wherein the thread pitch is from 0.5 mm to 0.75 mm.

27. The locking assembly of any of the preceding paragraphs, wherein the first end of the first rotation stop and the first end of the locking nut are correspondingly threaded, and wherein the thread pitch is from 0.5 mm to 1.0 mm.

28. The locking assembly of any of the preceding paragraphs, wherein the first end of the first rotation stop and the first end of the locking nut are correspondingly threaded, and wherein the thread pitch is from 0.5 mm to 1.25 mm.

29. The locking assembly of any of the preceding paragraphs, wherein the first end of the first rotation stop and the first end of the locking nut are correspondingly threaded, and wherein the thread pitch is from 0.75 mm to 1.25 mm.

30. The locking assembly of any of the preceding paragraphs, wherein the first end of the first rotation stop and the first end of the locking nut are correspondingly threaded, and wherein the thread pitch is from 1.0 mm to 1.25 mm.

31. The locking assembly of any of the preceding paragraphs, further including a grip secured to the locking nut and locking wedge.

32. A stationary platform comprising at least one telescoping leg comprising the locking assembly of any of the preceding paragraphs.

33. The stationary platform of paragraph 32, further comprising a second locking assembly, the second locking assembly comprising:

a first column portion having a hollow interior with a generally circular cross-section along a length of the first column portion;

an insert secured within an end portion of the first column portion, the insert having a first end which is solid contained within the first column portion, a threaded channel passing through the solid end, an inner cavity, and a second end which opens to the inner cavity;

wherein the inner cavity has a non-circular cross-section;

a second column portion having a main body and a first end, the first end having a non-circular cross-section corresponding to that of the inner cavity of the insert, wherein the first end is slidingly but not rotatably engaged with the inner cavity of the insert, the second column portion further having a channel through the first end, the channel being coaxial with the threaded channel of the insert; and a fastening rod having a threaded end, wherein the fastening rod passes through the channel of the second column portion and engages the threaded channel of the insert.

Various modifications and variations of the described structures, assemblies, apparatuses and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific preferred embodiments, it should be understood that the invention should not be unduly limited to such specific embodiments. While the preferred embodiments have been described in detail, and shown in the accompanying drawings, it will be evident that various further modifications are possible without departing from the scope of the invention as set forth in the appended claims. Indeed, various modifications of the described modes for carrying out the invention which are obvious to those skilled in marksmanship or related fields are intended to be within the scope of the following claims.

What is claimed is:

1. A locking assembly comprising:
a locking ring secured to a first cylindrical section, the first cylindrical section insertable into a second cylindrical section and having a bearing surface at a second edge;
a first rotation stop secured to the second cylindrical section at a first end and slidable against the locking ring at a second end;
a second rotation stop secured to the first rotation stop; and
a locking nut having a first end in threaded engagement with the first end of the first rotation stop and having a second end secured to a locking wedge having a bearing surface, wherein the locking nut is slidable against the second rotation stop;
wherein rotational movement of the locking nut in a first direction causes the bearing surface of the locking wedge to engage the bearing surface of the locking ring and rotational movement of the locking nut in a second direction causes the bearing surface of the locking wedge to disengage the bearing surface of the locking ring; and further wherein
the second rotation stop has a first bearing surface and the locking nut has a second bearing surface, the first bearing surface of the second rotation stop and the second bearing surface of the locking nut being opposed to one another, and wherein rotational movement of the locking nut in the second direction is limited by engagement of the first bearing surface of the second rotation stop and the second bearing surface of the locking nut.

2. The locking assembly of claim 1, wherein the locking ring has a first edge containing a second bearing surface and the first rotation stop has a bearing surface corresponding to the second bearing surface of the locking ring.

3. The locking assembly of claim 2, wherein rotational movement of the locking nut in the first direction causes the second bearing surface of the locking ring to engage the bearing surface of the first rotation stop and rotational movement of the locking nut in the second direction causes the second bearing surface of the locking ring to disengage the bearing surface of the first rotation stop.

4. The locking assembly of claim 1, wherein the locking ring, first rotation stop, locking nut and locking wedge are generally cylindrical and coaxial with each other and the first and second cylindrical sections.

5. The locking assembly of claim 1, wherein the first rotation stop has a second bearing surface, the second bearing surface of the first rotation stop and the first bearing surfaces of the locking nut being opposed to one another, and wherein rotational movement of the locking nut in the first direction is limited by engagement of the second bearing surface of the first rotation stop and the first bearing surface of the locking nut.

6. The locking assembly of claim 1, wherein the first end of the rotation stop and the first end of the locking nut are correspondingly threaded, and wherein the thread pitch is from 0.5 mm to 1.5 mm.

7. The locking assembly of claim 1, further including a grip secured to the locking nut and the locking wedge.

8. A stationary platform comprising at least one telescoping leg comprising the locking assembly of claim 1.

9. A locking assembly comprising:
a locking ring secured to a first cylindrical section, the first cylindrical section insertable into a second cylindrical section and having a bearing surface at a second edge;
a first rotation stop secured to the second cylindrical section at a first end and slidable against the locking ring at a second end;
a locking nut having a first end in threaded engagement with the first end of the first rotation stop and having a second end secured to a locking wedge having a bearing surface; and
a second rotation stop, wherein the locking nut is slidable against the second rotation stop;
wherein rotational movement of the locking nut in a first direction causes the bearing surface of the locking wedge to engage the bearing surface of the locking ring and rotational movement of the locking nut in a second direction causes the bearing surface of the locking wedge to disengage the bearing surface of the locking ring; and
wherein the second rotation stop has a first bearing surface and the locking nut has a second bearing surface, the first bearing surface of the second rotation stop and the second bearing surface of the locking nut being opposed to one another, and wherein rotational movement of the locking nut in the second direction is limited by engagement of the first bearing surface of the second rotation stop and the second bearing surface of the locking nut.

10. The locking assembly of claim 1, wherein the bearing surface at the second edge of the locking ring is at a diagonal relative to the first cylindrical section.

11. The locking assembly of claim 10, wherein the bearing surface of the locking wedge has an angle corresponding to the diagonal of the bearing surface at the second edge of the locking ring.

12. The locking assembly of claim 9, wherein the locking ring has a first edge containing a second bearing surface and the first rotation stop has a bearing surface corresponding to the second bearing surface of the locking ring.

13. The locking assembly of claim 12, wherein rotational movement of the locking nut in the first direction causes the second bearing surface of the locking ring to engage the bearing surface of the first rotation stop and rotational movement of the locking nut in the second direction causes the second bearing surface of the locking ring to disengage the bearing surface of the first rotation stop.

14. The locking assembly of claim 9, wherein the locking ring, first rotation stop, locking nut and locking wedge are generally cylindrical and coaxial with each other and the first and second cylindrical sections.

15. The locking assembly of claim 9, wherein the first rotation stop has a second bearing surface, the second bearing surface of the first rotation stop and the first bearing surfaces of the locking nut being opposed to one another, and wherein rotational movement of the locking nut in the first direction is limited by engagement of the second bearing surface of the first rotation stop and the first bearing surface of the locking nut.

16. The locking assembly of claim 9, wherein the first end of the rotation stop and the first end of the locking nut are correspondingly threaded, and wherein the thread pitch is from 0.5 mm to 1.5 mm.

17. The locking assembly of claim 9, further including a grip secured to the locking nut and the locking wedge.

18. A stationary platform comprising at least one telescoping leg comprising the locking assembly of claim 9.

* * * * *